Oct. 28, 1952   E. A. MILLER ET AL   2,615,586
MOBILE BALE HANDLING EQUIPMENT
Filed Feb. 7, 1949   5 Sheets-Sheet 2

INVENTORS
EINER A. MILLER
ELMER I. MAY
BY
Westall & Westall
ATTORNEYS

Oct. 28, 1952 E. A. MILLER ET AL 2,615,586
MOBILE BALE HANDLING EQUIPMENT
Filed Feb. 7, 1949 5 Sheets-Sheet 3

INVENTORS
EINER A. MILLER
ELMER I. MAY
BY
Westall & Westall
ATTORNEYS

Oct. 28, 1952　　　E. A. MILLER ET AL　　　2,615,586
MOBILE BALE HANDLING EQUIPMENT

Filed Feb. 7, 1949　　　　　　　　　　　　　　5 Sheets-Sheet 5

INVENTORS
EINER A. MILLER
ELMER I. MAY

BY
*Westall & Westall*
ATTORNEYS

Patented Oct. 28, 1952

2,615,586

UNITED STATES PATENT OFFICE 2,615,586

MOBILE BALE HANDLING EQUIPMENT

Einer A. Miller, Clearwater, and Elmer I. May, Yucaipa, Calif.

Application February 7, 1949, Serial No. 74,982

8 Claims. (Cl. 214—83.16)

This invention relates to mobile bale handling equipment, and more specifically contemplates a truck incorporating means for lifting bales of hay or the like from the ground for stacking in the truck and for subsequently redepositing the bales in stacked condition upon the ground.

Hay is ordinarily baled where it is grown and the bales are necessarily dropped indiscriminately over the field. The collection and stacking of the bales in a truck is always a difficult and time consuming operation when done manually and in many instances when the temperature is very high, workmen are not easily available. Removal of the collected bales and restacking at the point of storage is equally difficult. The time spent in removing the bales from the field correspondingly delays the irrigation of the field and the growth of a new crop for subsequent cutting.

It is a principal object of the present invention to provide a truck equipped with an inclined conveyor by which the bales may be elevated from the ground incident to proper direction of the truck by the driver to facilitate stacking of the bales within the truck, in combination with means for subsequently unloading the entire stack as a unit at the point of intended storage.

More specifically, an object hereof is to provide a conveyor mechanism suspended from the side of a truck equipped with a load-supporting bed, embodying a pair of platforms disposed at different heights above and laterally of the bed, the conveyor mechanism comprising a single frame for supporting a pair of conveyors extending between the ground and the lower platform and between the platforms, respectively, the upper conveyor being pivotally mounted to permit its displacement whereby the bales elevated from the ground may be selectively advanced to either of the platforms for stacking within the truck.

Another object is to provide a truck equipped with a bale-supporting bed normally suspended in elevated position with respect to the ground but adapted to be lowered onto the ground with the stacked bales thereon to facilitate unloading of the bales onto the ground.

Another object is to provide an unloading frame normally forming the forward end of the load-supporting bed in combination with means for shifting the frame rearwardly so as to push the bales in stacked condition from the bed onto the ground, this operation being effective to compress the stack and thereby minimize soaking of the bales by rain or their excessive drying by wind during storage.

Still another object is to provide the power and transmission mechanism for actuating the conveyors, raising and lowering the load-supporting bed and for shifting the unloading frame as required, in response to control means adapted for convenient location whereby all mechanism including the truck itself may be actuated and controlled by the driver of the truck.

Still another object is the provision of means to obviate lateral oscillation or vibration of the vertically movable bale-supporting bed during operation of the truck.

Still another object is the provision of means for pivotally supporting the entire lower conveyor assembly in combination with runners depending from its lower end to contact the ground and raise the conveyor over obstruction while in use, and a hydraulic lift to elevate the assembly from the ground when not in use.

Numerous other objects and salient features of my invention, such for example, as simplicity of operation, particularly in the manner in which the upper conveyor is displaced for moving bales onto the lower platform, the provision of hydraulically powered means for raising and lowering the lower conveyor, the provision of a roller intermediate the conveyor to perform the dual function of assuring the complete movement of the bales onto the lower platform when the upper conveyor is not in use, and to transport the bales from one conveyor to the other when occasion demands, will be apparent to those of skill in the art upon an examination of the following description read in the light of the accompanying drawings, in which:

Referring to the drawings more in detail, the numerals of which indicate similar parts throughout the several views 10 designates generally a truck comprising a frame, a cab 11 for the driver, and front wheels 12. The forepart of the frame is conventional in form and accordingly is not illustrated. Rearwardly of the cab 11, the frame comprises a pair of parallel beams 13, which define the sides of the chassis of the truck, and a transverse beam 14 connected between the foremost ends of the beams 13. The U-shaped chassis frame 15 thus formed is rigidly connected to the forepart of the truck chassis by parallel frame members 16. A plurality of uprights 17 mounted in spaced relation upon each beam 13 of the frame and connected across the upper ends of the latter by reinforcing rails 18, comprise the sides of the load-receiving compartment of the truck. The uprights 17 are reinforced by a series of braces 19. The rear of the truck is sustained by wheels 20 journalled upon stub axles 21 which are mounted, in a suitable manner well known to the art, to the respective beams 13 so as to support the frame 15 in a normally horizontal position. The power of the truck engine (not shown) is transmitted through a drive shaft 22 and conventional differential gearing (the housing for which is indicated at 23) to a pair of lateral shafts 24 disposed intermediate the cab 11 and the load-receiving compartment. Sprockets 25 carried by the ends of the lateral shafts 24 are engaged by drive chains 26 by which the power is transmitted to the rear wheels 20 in an obvious manner.

The load-receiving platform or bed 27 is similar in shape and approximates the size of the U-shaped chassis frame 15 formed by beams 13 and 14, and is normally suspended from the underside of the longitudinal beams 13 by means about to be described, but is adapted to be lowered into close proximity with the roadbed when required. Support for the bed 27 of the truck against the underside of the frame 15, and the control of its vertical movement is provided by four hydraulic jacks 28, two of which are located in spaced relationship at each side of the bed 27. Each jack 28 comprises a cylinder 29 mounted by suitable means in vertical position to one of the beams 13. The piston rod 30 of each jack 28 extends from the lower end of the cylinder 29 and is connected to a bracket 31 projecting laterally from the adjacent edge of bed 27. Hydraulic pressure is supplied to the cylinder 29 of each jack below the piston 30 therein through a hose 32 leading from the sump of a pump of conventional construction, indicated generally at 33. Power for actuation of pump 33 is supplied by a shaft 34 leading from the transmission (not shown) of the truck. The shaft 34 is equipped with a sprocket 35 which is engaged by a chain 36 for transmitting the rotary motion of the shaft 34 to a sprocket 37 connected to the pump shaft 38. As the details of this pump mechanism are well known in the art and form no part of the present invention they are not illustrated. Fluid pressure in each jack 28 is relieved when required through the hose 32 for return to the pump 33. Conventional means for controlling the introduction and relief of hydraulic pressure into and from the several jacks 28 are preferably located in the cab 11 of the truck so as to enable the driver to vary the elevation of the bed 27 at any time.

Figure 9:
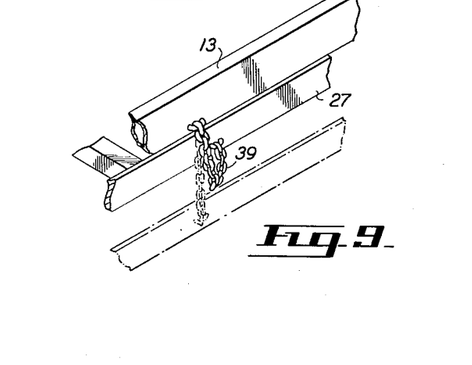
Fig. 9 is a broken perspective view of a section of the unloading frame and bed illustrating particularly one of the chains which determines the lowermost position of the bed.
Figure 10:
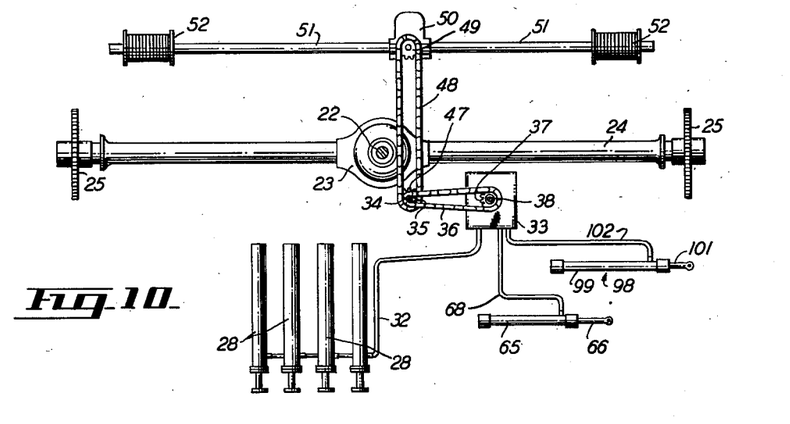
Fig. 10 is a diagrammatic view showing the relationship of the mechanisms by which the power of the truck engine is distributed to the truck wheels and conveyor, the means for actuating the unloading frame, and the pump for producing pressure in the hydraulic system.

The downward movement of the bed 27 is limited by four chains 39 connected between the respective ends of the beams 13 on the frame and the corresponding corners, respectively, of the bed so as to suspend the bed from frame 15 in close proximity, but in spaced relationship, to the roadbed when hydraulic pressure is relieved from the jacks 28.

Figure 6:
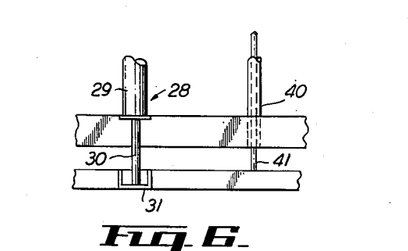
Fig. 6 is an enlarged fragmentary side elevation of the load-supporting bed and chassis, showing one of the hydraulic rams for lifting the bed and one of the guides for resisting lateral displacement of the bed.

In order to obviate lateral oscillation of the bed during movement of the truck over rough terrain and to thus avoid excessive lateral stress upon the pistons of the several jacks 28, we provide four guides for the bed located at opposite sides of the back of the truck chassis. The guides at each side of the truck consists of a heavy tube 40 mounted rigidly in vertical position in an opening in the beam 13. The upper end of a rod 41 is telescoped snugly within each tube 40 and the lower end of the rod is secured rigidly to the marginal edge of bed 27 therebelow. The snug fit of the rods 41 within the respective tubes 40, while permitting vertical movement of the bed in response to actuation of the jacks 28, resist relative lateral movement between the bed and frame throughout the range of movement of the bed.

In order to further reinforce the described relationship between the frame 15 and bed 27 during the unloading operation, as is hereinafter more in detail described, a pair of chains 42 are connected between the truck frame members located beneath the cab 11 and the forward end of bed 27. Each chain 42 is normally slack but is of a length to be drawn taut when the bed is in its lowermost position so as to supplement the guides 40—41 in preventing rearward movement of the bed while the load is pushed from the truck by the unloading frame, about to be described.

Figure 5:
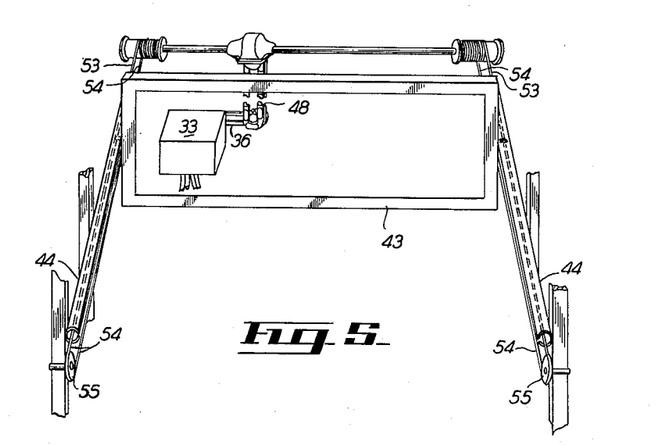
Fig. 5 is a perspective view of the unloading frame and actuating means therefor.
Figure 7:
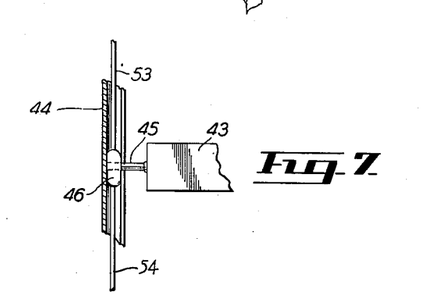
Fig. 7 is a broken plan view of one of the tubular guides by which the unloading frame is suspended, showing the connection of the actuating cables to the frame.
Figure 8:
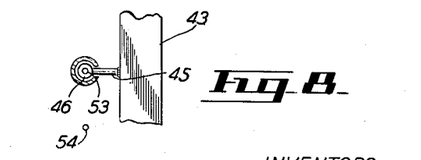
Fig. 8 is a transverse sectional view through one of the guides depicted in Fig. 7 showing the opposite reaches of one of the cables by which the unloading frame is moved to the rear of the truck.

Above and extending transversely across the forward end of the bed 27 is an unloading frame 43 for moving bales stacked upon the bed from the latter in stacked condition and onto the ground or other area of intended storage. The frame 43 is rectangular and of a length slightly less than the distance between the sides of the load-receiving compartment, and is suspended above the bed, in vertical, parallel relation to the beam 14 of the frame, from said sides. A pair of longitudinally split tubes 44 are rigidly mounted in horizontal, parallel relationship across the uprights 17 and braces 19 forming the respective sides of the truck at a height above the bed, when the latter is in its uppermost position, slightly more than one-half the height of the frame 43. The tubes 44 are arranged with the arcs in which the splits are formed, flanking the unloading frame 43 and in opposition to one another. A pin 45 extends laterally from the middle of each vertical side member of the frame 43 into the bore of the adjacent tube 44 through the split in the latter. Each pin 45 is secured rigidly in a rod 46 slidable within the tube 44 so as to resist rotative movement of the pins and the tilting of the frame. Thus the frame is suspended by the pins 45 and tubes 44 from the sides of the load-receiving compartment and may be shifted longitudinally of the truck incident to movement of the rods 46 in a corresponding direction within the bores of the split tubes. Power for the movement of the unloading frame 43 from the forward end of the loading area to the back of the truck and for its return to original position is supplied by the engine of the truck through the transmission and take off shaft 34. A second sprocket 47 carried by the rearward end of the shaft 34 is engaged by a chain 48 which transmits the power to a sprocket 49 of a gear reduction unit 50, so as to drive, at uniform speeds, a pair of laterally projecting shafts 51. Spools 52 carried on the outer ends of the shafts 51 are disposed in substantial alignment with the respective tubes 44. A pair of cables 53 and 54 are connected to each spool 52 one of which extends rearwardly below and parallel to the tube 44 at the corresponding side of the truck, to the rear end of the frame 15, where it passes over a pulley 55 journalled to the rearmost upright 17 of the side of the truck. From the upper arc of the pulley 55 the cable 53 at each side of the truck projects forwardly into the bore of the adjacent tube 44 and is secured to the rod 46 slidable within the tube. The other cable 54, normally reeled upon each pulley 55, extends directly into the adjacent end of the tube 44 at the corresponding side of the truck for connection to the opposite end of the rod 46 therein. Thus rotation of the shafts 51 and spools 52 in one direction exerts tension upon the cables 53 and draws the unloading frame 43, suspended by the rods 46 within the respective tubes 44, rearwardly to the back of the bed, thus unreeling the cables 54.

The loading of the truck is facilitated by a sectional conveyor suspended pivotally from the driver's side of the truck in a manner about to be described. The conveyor comprises generally a lower section 56 adapted to engage the bales while the latter are resting upon the ground and to raise and deposit the bales upon a platform 57 fastened to the uprights 17 at the corresponding side of the truck below the level of the upper rail 18, or, selectively, upon an upper conveyor section 58. Bales deposited upon the platform 57 are accessible to a workman standing upon the bed 27 to assist the loading of the truck, and may be drawn from the platform 57 between the uprights 17 of the side of the truck for stacking upon the bed. The outside and back of the platform 57 is enclosed by a railing 59 to prevent the bales from inadvertently falling from the platform before being withdrawn by the workman.

Figure 4:
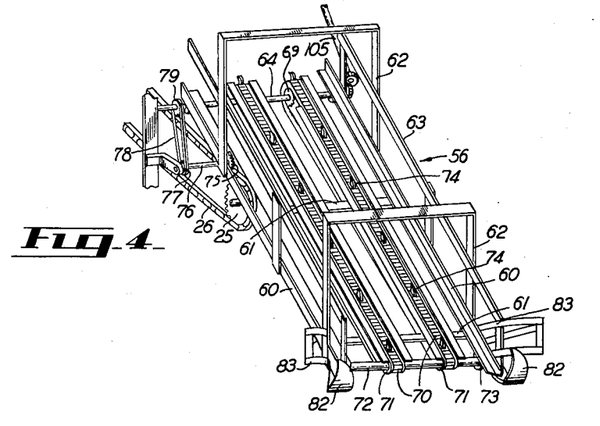
Fig. 4 is a fragmentary perspective view of the lower conveyor illustrating the means for directing the lower conveyor over obstructions and the guide rails for the bales to be loaded.

The lower conveyor 56, by which the bales are raised from the ground, comprises a frame composed of a pair of angle irons 60 held in parallel spaced relation by a plurality of transverse braces 61 and a pair of inverted U-shaped members 62 overhanging the area between the angle irons 60. 63 indicates railings supported by each angle iron 60 to define the sides of the lower conveyor. The upper end of the lower conveyor is pivotally supported on the side of the truck forward of the platform 57 by a shaft 64, journalled in suitable bearings carried by hangers suspended from the forward end of the platform. The lower conveyor frame is pivotally mounted upon the shaft 64 so as to permit unrestricted rotation of the shaft and the pivoting of the conveyor frame relative to the shaft. The lower end of the conveyor 56 is variably supported by hydraulic means comprising a cylinder 65 and piston (the latter, not shown) to which a rod 66 is connected. The cylinder 65 is pivotally mounted upon a bracket 67, projecting forwardly from the end of the adjacent frame element 13 and the piston rod 66 is similarly pivoted to the center of the brace 61 which is located intermediate the ends of the conveyor frame. Thus, most of the weight of the lower section 56 of the conveyor assembly is carried by the piston and rod 66 in which hydraulic fluid is supplied from the pump 33 by a hose 68. The control of the flow of fluid under pressure between the pump 33 and cylinder 65 is preferably located in the cab 11 so as to enable the driver to raise and lower the lower conveyor 56 while driving the truck, in accordance with specific requirements.

Keyed on the shaft 64 in equi-spaced relation between the angle irons 60 forming the sides of the conveyor are a pair of sprockets 69 for a pair of conveyor chains 70. The lower ends of the chains 70 pass over the sprockets 71 of a pair similarly mounted on an idler shaft 72, journalled in bearings 73 secured to the underside of the respective angle irons 60 adjacent the lower end of the conveyor section 56. Each of the chains 70 carries a plurality of teeth 74, equi-spaced along its length and projecting outwardly from the chain for engagement of the bales against which the lower reaches of the chains are moved in accordance with the operation of the device, and for retaining the bales on the upper reaches of the chains as the same are moved upwardly in response to the application of power to the upper conveyor shaft 64.

The chains 70 are driven from the drive chain 26 for the rear wheel 20 located at the corresponding side of the truck. A sprocket 75 mounted upon a stub shaft 76, journalled in a bearing carried by the adjacent upright 17 of the side of the truck is arranged for continuous engagement with the upper reach of the drive chain 26 adjacent sprocket 25. A second sprocket 77, mounted on the shaft 76 is engaged by a conveyor drive chain 78 which passes over a sprocket 79 carried by the conveyor drive shaft 64 at the upper end of the conveyor. Thus, the lower conveyor chains 70 will be continuously driven while the truck is moving in response to the power of the engine regardless of the angle of inclination of the conveyor. Conversely, adjustment of the height of the lower end of the conveyor relative to the ground may be accomplished at any time without stopping either the truck or conveyor.

The upper ends of the conveyor chains 70 extend to adjacent the level of the platform 57. In order to assure the movement of the bales from the chains and onto the platform, we provide an idler roller 80 having its ends journalled in bearings carried, respectively, by a plate 81, flanking the forward end of the platform 57 and by the adjacent upright 17 of the side of the truck. The roller 80 is positioned horizontally above the forward end of the platform 57 slightly below the plane of the upper reaches of the lower conveyor chains 70 so as to receive the bales from the latter. Each bale is thus tilted over the roller 80 and falls upon the platform free of the teeth 74 of the chains 70.

In accordance with the use of the truck in collecting baled hay under normal circumstances, the truck will ordinarily be driven over rough terrain on which the hay is grown. Accordingly, the lower end of the conveyor is equipped with a pair of runners 82 having their forward ends curved upwardly so as to enable the conveyor to ride over any ordinary obstructions that might be encountered in the field.

To facilitate the engagement of the teeth 74 of the conveyor chains 70 with bales to be loaded and lying on the ground, arcuate guides 83 are mounted at opposite sides of the lower end of the conveyor frame. The guides 83 are curved outwardly in opposite directions whereby movement of either of the guides against a bale on the ground tends to shift the latter into the effective path of movement of the conveyor whereby the teeth 74 of the chains 70 will engage and raise the bale, as above described.

Figure 11:
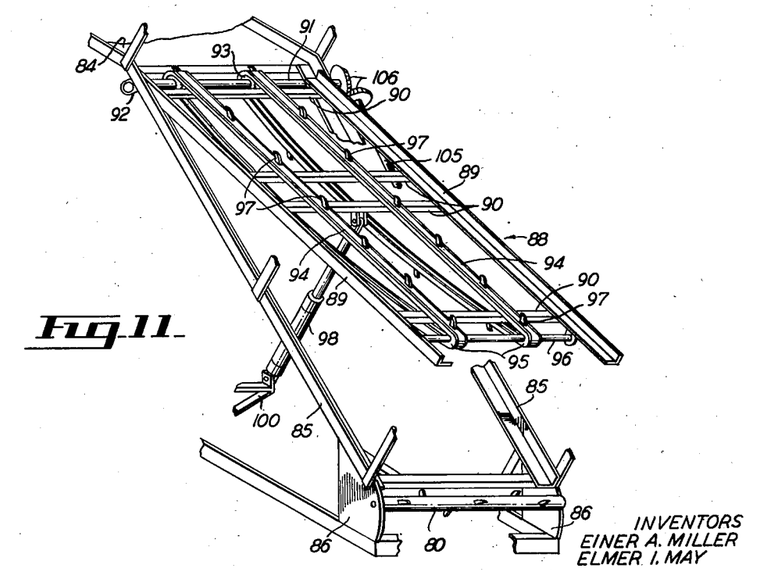
Fig. 11 is a broken perspective view of the upper conveyor assembly, showing the inner frame of the latter in elevated inoperative position.

The upper conveyor section 58 comprises an outer frame forming a structurally independent but functional continuation of the lower conveyor assembly. Secured rigidly to the upper end of the conveyor section 58 is a platform 84 which is supported in horizontal position at a height considerably above the top rails 18 of the sides of the truck so as to receive bales elevated from the ground by both conveyors, as is hereinafter more in detail described. The outer frame of the upper conveyor 58 comprises a pair of angle irons 85 which are secured in parallel relationship and spaced apart a distance substantially equal to the distance between the sides of the lower conveyor frame 56 of which the respective angle irons 85 are continuations. The outermost angle 85 is secured rigidly to the upper platform 84, and its lower end is similarly attached to the plate 81 comprising a part of the lower platform 57. The inner angle iron 85 of the upper conveyor frame is also connected at its upper end to the upper platform 84 and at its lower end to a plate 86 flanking the lower platform. The inner and outer angle irons 85 each support a railing 87 for resisting lateral displacement of the bales carried by conveyor 58.

Pivotally carried by the outer frame of the upper conveyor assembly is an inner frame 88 comprising angle irons 89 and cross members 90, the latter to maintain the same in spaced relatively rigid relationship. The width of the inner frame 88 is only slightly less than the width of the outer frame whereby the angle irons 89 of the former normally rests upon and are supported by the angle irons 85 of the latter or outer frame. The upper end of the inner frame 88 is pivoted upon an upper conveyor drive shaft 91, which is journalled in hangers 92 carried by the outer frame 85 adjacent the upper end of the assembly, for a purpose later described. Mounted upon the shaft 91 in spaced relationship, are a pair of sprockets 93 which are engaged by a pair of endless conveyor chains 94 similar to chains 70. Chains 94 extend to the lower end of the double conveyor frame section 58 where they pass over a pair of idler sprockets 95 mounted upon a shaft 96 journalled in bearings suspended in the lower end of the inner frame 88. The chains are each equipped with teeth 97, equi-spaced apart so as to project upwardly from the upper reach of the chains for engagement of bales directed onto the upper conveyor 58 from the lower conveyor 56 and roller 80.

When bales are to be moved onto the lower platform 57 the upper conveyor 58 is pivotally displaced from its normal position, as immediately above described. For this purpose, we provide a hydraulic ram 98 comprising a cylinder 99 pivoted upon a bracket 100 projecting laterally from the top rail 18 of the adjacent side of the truck, and a plunger, reciprocable within the cylinder 99. Connected to the piston is a rod 101 which is pivoted to the middle of an intermediate cross member 90 of the pivoted conveyor frame 88. The lower end of the cylinder 99 is connected by a hose 102 with the pump 33 whereby introduction of hydraulic pressure into the cylinder 99 below the piston therein is operable to raise the lower end of the upper conveyor 58 from alignment with the lower conveyor 56 and open the lower platform 57 to reception of bales raised by the lower conveyor.

Figure 1:
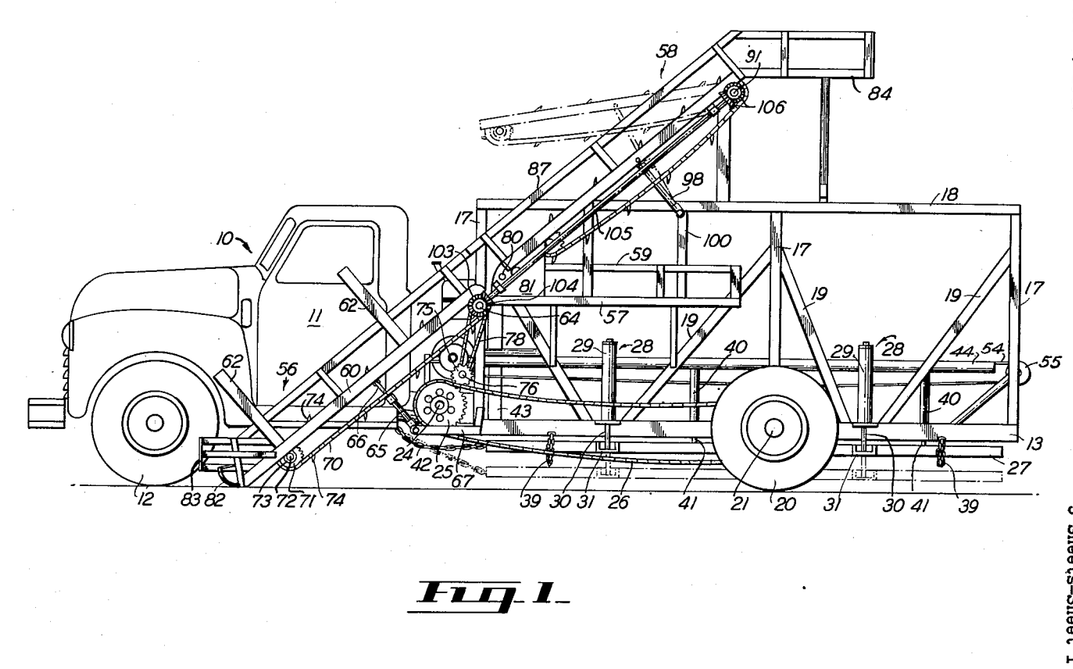
Fig. 1 is a side elevation of a truck equipped with my invention.
Figure 2:
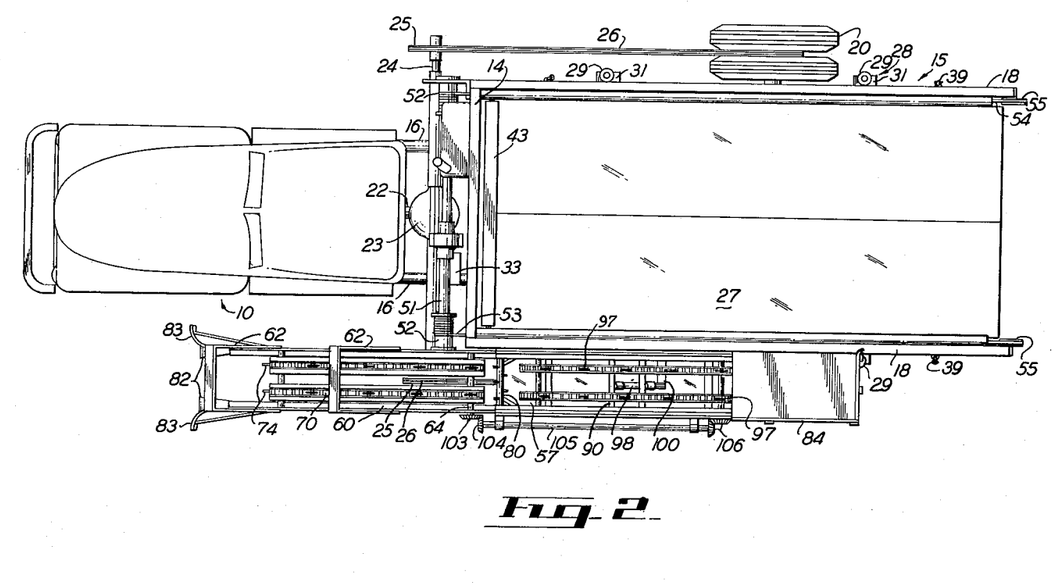
Fig. 2 is a top plan view of the truck shown in Fig. 1.
Figure 3:
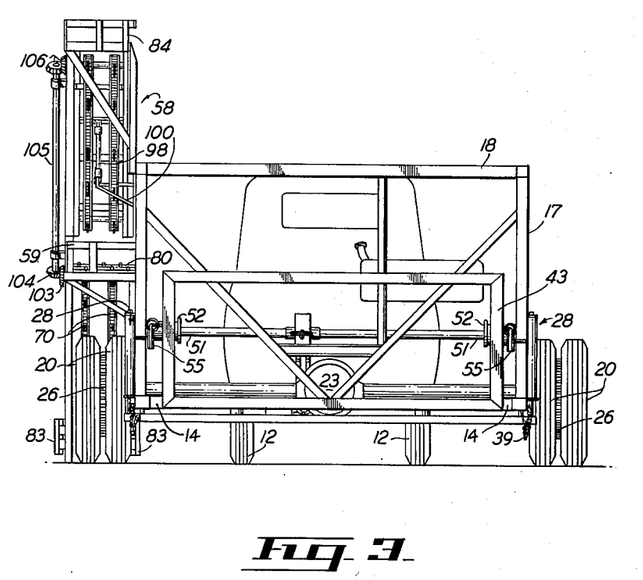
Fig. 3 is a rear elevation of the truck illustrating particularly the frame by which a stack of bales is unloaded.

Power for the upper conveyor is transmitted from the drive shaft 64 of the lower conveyor 56 and to this end the latter shaft carries a bevel gear 103 at its outermost end which is in mesh with a complementary bevel gear 104 secured to the lower end of an inclined shaft 105, journalled in bearings carried by the outer angle iron 85 of the upper stationary frame. The upper end of the shaft 105 is operatively connected to the upper conveyor drive shaft 91 at the upper end of the conveyor by bevel gears 106. Thus, actuation of the lower conveyor 56 by the chain 78 and shaft 64 will coincidentally rotate the shaft 91, both shafts being turned in a clockwise direction as viewed in Fig. 1.

The operation of the conveyor system is briefly described as follows: In accordance with conventional practice hay as it is baled is dropped in the field in which it is grown for subsequent collection and storage. The present conveyor is adapted to pick up the bales from the ground and shift each bale onto one or the other of the platforms 57 and 84.

When not engaged in actually picking up bales, the lower conveyor 56 may be supported in elevated position with respect to the ground by the hydraulic jack 65—66 controlled from the driver's cab. In this manner, the truck may be driven across the field at a higher speed than would otherwise be possible. Preparatory to stacking bales within the truck at a level below the lower platform 57 the upper conveyor 58 is elevated by the ram 98 out of alignment with the lower conveyor. When the truck approaches a bale to be loaded, the lower conveyor 56 is lowered until the runners 82 touch the ground whereupon the driver directs the lower end of the conveyor chains 70 against the bale by proper direction of the truck. In the event that the truck is misdirected slightly the abutment of one or the other of the curved guides 83 will assist in deflecting the bale against the chains 70 of the lower conveyor whereupon the teeth of the chains will engage and raise the bale onto the lower platform 57, as hereinabove described, the upper conveyor having been previously elevated by the hydraulic jack. A workman riding upon the loading bed 27 immediately pulls the bale from the platform 57 between the uprights 17 of the side of the truck and positions the bale upon the bed in proper position for accommodation of other bales. Successive bales deposited upon the lower platform 57 are stacked upon the bed in layers until the stacked bales reach a height approximating the level of the platform 57. Thereupon the upper conveyor 58 is lowered, incident to relief of pressure within the hydraulic ram 88, onto the outer frame 85 into alignment with the lower conveyor. Thereafter bales lifted from the ground by the lower conveyor are pushed over the roller 86 and into engagement with teeth of the upper conveyor 58, which latter elevates the bales onto the upper platform 84 from which they may be pulled by the workman to continue the stacking operation upon bed 27.

When the stack of bales upon the bed has reached the height of the upper platform 84, the lower conveyor 56 may again be elevated and the truck driven to the point at which the bales are to be unloaded. The unloading of the truck is accomplished as a single unitary operation. The bed 27 is first lowered to a position closely adjacent to the ground by a gradual release of pressure within the hydraulic cylinders 29. Power is then applied to the spools 52 so as to tension the cables 53 connected to the unloading frame 43 and coincidentally the truck is moved forward at a speed corresponding to or slightly less than the speed of rearward movement of the frame 43 across the bed 27 in response to reeling of the cables 53. The pressure of the frame 43 against the stacked bales moves the entire stack rearwardly from the bed and onto the ground, the bed being moved forward from under the stack as the successive columns of the bales are pushed onto the ground. It will be appreciated that the pressure required to push the entire load from the bed will be substantial and that as a result the stack will be compressed if the truck is driven forwardly at a speed not greater than the speed of movement of frame 43 rearwardly over the bed. In order to assure the compression of the stacked bales the truck may be braked slightly to limit its forward movement in response to the pressure of the frame against the load. Thus the bales are stacked in closer relationship than when stacked manually, resulting in the double advantage of obviating excessive drying by the wind and tending to resist saturation by rain. The chains 39 obviate or minimize friction between the bed and the ground so as to facilitate the unloading operation and the chains 42 prevent undue stress upon the guides 40—41 tending to result from the friction between the load and bed as the bales are pushed from the latter. After the load has been removed from the bed, the unloading frame is returned to its original position at the forward end of the load-receiving compartment by reversing the rotation of the pulleys 55 so as to reel the cables 54 and thereby draw the frame forwardly.

The single embodiment depicted in the drawings is susceptible to numerous changes in size, design, shape, number and proportion of their parts and more specifically may be equipped with a floating rear axle extending beneath bed 27 and adapted to be lowered with the latter for purposes of unloading, and that the conveyors 56 and 58, platforms 57 and 84, and sides of the truck may be formed to accommodate and retain loose, bulk products, in which case a solid movable wall of suitable dimensions may be substituted for the unloading frame 43 shown, without departing from the spirit of my invention as defined by the appended claims.

What we claim and desire to secure by Letters Patent is:

1. In a conveyance comprising an engine and a frame supported by wheels upon a road bed, a load-receiving bed, means to normally support said bed at a level substantially above the road bed, means to raise and lower said bed, means to limit the downward movement of the load-receiving bed to a level slightly above the level of the road bed, an unloading frame carried by the frame vertically disposed above said load-receiving bed, means to shift said unloading frame rearwardly from a position above the forepart of the bed to push a load from the load-receiving bed onto the roadbed and to compress the load, an actuating member to transmit the power of the engine to said last-named means, and means to brake the conveyance during rearward movement of the unloading frame to resist forward movement of the truck incident to resistance of the load to compression.

2. In a conveyance comprising a frame supported by wheels upon a road bed, a load-receiving bed, means carried by the frame of the conveyance to raise and lower said bed relative to said wheels, means to limit the downward movement of said bed to a level slightly above the road bed, an unloading frame disposed above the forepart of said bed, means to shift said unloading frame rearwardly across said bed, and flexible elements connected between the frame and said bed to limit rearward movement of the bed during actuation of said unloading frame.

3. In a conveyance comprising a frame supported by wheels upon a road bed, a load-receiving bed suspended from said frame, a pair of platforms carried by said frame at different levels above the level of said bed, the lower platform being disposed forward of the upper platform and adjacent the forepart of the bed, an inclined conveyor carried by said frame and extending normally from the forepart of said lower platform to adjacent the road bed, a second conveyor pivotally carried by said frame extending between the upper end of the lower conveyor and the upper platform, and means to pivotally displace the lower end of said upper conveyor from alignment with said lower conveyor.

4. In a conveyance comprising a frame supported by wheels upon a road bed, a load-receiving bed suspended from said frame, a pair of platforms carried by said frame at different levels above the level of said bed, means to raise and normally move onto said lower platform material to be loaded upon said load-receiving bed, a conveyor carried by said frame extending between said platforms, whereby said conveyor will receive material to be loaded from said first-named means and carry the same to said upper platform, and means to shift said conveyor into and out of a position between said first-named means and said upper platform.

5. In a conveyor comprising a frame supported by wheels upon a road bed, a bed and sidewalls, a pair of platforms mounted at different levels to one of said sidewalls so as to project laterally of said load-receiving compartment, a first elevator to raise material to be loaded into said compartment from the road bed to the lower platform, a second elevator above the first to raise material from the first elevator to the upper platform, and means for placing said second elevator in and out of tandem relation with the first elevator.

6. In a conveyor comprising a frame supported by wheels upon a road bed, a bed and sidewalls, a pair of platforms mounted at different levels to one of said sidewalls so as to project laterally of said load-receiving compartment, means to elevate material to be loaded into said compartment from the road bed and to direct the same to either of said platforms, selectively, and means to raise and lower said load-receiving bed relative to said platforms.

7. In a conveyor comprising a frame supported by wheels upon a roadbed, a load-receiving compartment comprising a bed and sidewalls, a pair of platforms mounted at different levels to one of said sidewalls so as to preject laterally of said load-receiving compartment, means comprising a conveyor interposed between the roadbed and the lowermost of said platforms to elevate from the roadbed material to be loaded to said lower platform, and means comprising a second conveyor interposed between said platforms to receive material to be loaded into said compartment from said lower conveyor and transmit the same to the uppermost of said platforms.

8. In a conveyor comprising a frame supported by wheels upon a roadbed, a load-receiving compartment comprising a bed and sidewalls, a pair of platforms mounted at different levels to one of said sidewalls so as to project laterally of said load-receiving compartment, means comprising a conveyor interposed between the roadbed and the lowermost of said platforms to elevate from the roadbed material to be loaded to said lower platform, and means comprising a second conveyor interposed between said platforms to receive material to be loaded into said compartment from said lower conveyor and transmit the same to the uppermost of said platforms, and means to displace the lower end of said second conveyor from load-receiving position with respect to said first-named conveyor, whereby said first conveyor is operable to direct material to be loaded onto the lowermost platform.

EINER A. MILLER.
ELMER I. MAY.

REFERENCES CITED

The following references are of record in the file of this patent:

UNITED STATES PATENTS

| Number | Name | Date |
|---|---|---|
| 758,739 | Culp | May 3, 1904 |
| 1,095,255 | Williams | May 5, 1914 |
| 1,188,986 | Paulson | June 27, 1916 |
| 1,382,328 | Stone | June 21, 1921 |
| 1,853,253 | Bennett | Apr. 12, 1932 |
| 2,065,973 | Jones | Dec. 29, 1936 |
| 2,240,564 | Le Tourneau | May 6, 1941 |
| 2,259,558 | Evans | Oct. 21, 1941 |
| 2,312,779 | Smith | Mar. 2, 1943 |
| 2,402,465 | Templeton | June 18, 1946 |
| 2,410,238 | Ringrose | Oct. 29, 1946 |
| 2,418,726 | Rogers, Jr. | Apr. 8, 1947 |
| 2,463,987 | Malone et al. | Mar. 8, 1949 |
| 2,492,608 | Wilms | Dec. 27, 1949 |
| 2,512,333 | Jaffa et al. | June 20, 1950 |
| 2,512,339 | Knapp, Jr. | June 20, 1950 |
| 2,517,304 | Greening | Aug. 1, 1950 |
| 2,531,560 | De Wall | Nov. 28, 1950 |
| 2,541,523 | Lang | Feb. 13, 1951 |
| 2,573,342 | Knox, Jr. et al. | Oct. 30, 1951 |